(12) United States Patent
Yarlagadda et al.

(10) Patent No.: US 7,296,112 B1
(45) Date of Patent: Nov. 13, 2007

(54) HIGH BANDWIDTH MEMORY MANAGEMENT USING MULTI-BANK DRAM DEVICES

(75) Inventors: Ramesh Yarlagadda, Pleasanton, CA (US); Shwetal Desai, Fremont, CA (US); Harish R. Devanagondi, Saratoga, CA (US)

(73) Assignee: Greenfield Networks, Inc., Sunnyvale, CA (US)

( * ) Notice: Subject to any disclaimer, the term of this patent is extended or adjusted under 35 U.S.C. 154(b) by 365 days.

(21) Appl. No.: 10/734,082

(22) Filed: Dec. 10, 2003

Related U.S. Application Data

(60) Provisional application No. 60/432,528, filed on Dec. 10, 2002.

(51) Int. Cl.
    *G06F 12/00* (2006.01)
(52) U.S. Cl. ..................... 711/105; 711/157
(58) Field of Classification Search ............. 711/105, 711/157
    See application file for complete search history.

(56) References Cited

U.S. PATENT DOCUMENTS

| | | | |
|---|---|---|---|
| 5,905,725 A | 5/1999 | Sindhu et al. | |
| 6,006,318 A * | 12/1999 | Hansen et al. | 712/28 |
| 6,138,219 A * | 10/2000 | Soman et al. | 711/149 |
| 6,160,819 A | 12/2000 | Partridge et al. | |
| 6,178,517 B1 * | 1/2001 | Bertin et al. | 713/324 |
| 6,405,286 B2 * | 6/2002 | Gupta et al. | 711/127 |
| 2002/0053001 A1 * | 5/2002 | Miura et al. | 711/105 |
| 2003/0052885 A1 * | 3/2003 | Hampel et al. | 345/501 |

OTHER PUBLICATIONS

Bennett, Jon C. R., "Packet Reordering is Not Pathological Network Behavior," Dec. 1999, pp. 789-798, vol. 7, No. 6, IEEE/ACM Transactions on Networking.
Adiseshu, Hari, Parulkar, Guru and Varghese, George, "A Reliable and Scalable Striping Protocol," 11 pages, Department of Computer Science, Washington University, St. Louis, MO, "The referenced paper is to appear in *Computer Communication Review*, a publication of ACM SIGCOMM, vol. 26, No. 4, Oct. 1996. ISSN #0146-4833," according to ACM SIGCOMM '96 paper retrieval site, Retrieved from the Internet Jan. 15, 2003 <http://www.acm.org/sigcomm/sigcomm96/papers/adiseshu.html>, attached.

(Continued)

*Primary Examiner*—Woo H. Choi
(74) *Attorney, Agent, or Firm*—Fenwick & West LLP

(57) ABSTRACT

The disclosure describes implementations for accessing in parallel a plurality of banks across a plurality of DRAM devices. These implementations are suited for operation within a parallel packet processor. A data word in partitioned into data segments which are stored in the plurality of banks in accordance with an access scheme that hides pre-charging of rows behind data transfers. A storage distribution control module is communicatively coupled to a memory comprising a plurality of storage request queues, and a retrieval control module is communicatively coupled to a memory comprising a plurality of retrieval request queues. In one example, each request queue may be implemented as a first-in-first-out (FIFO) memory buffer. The plurality of storage request queues are subdivided into sets as are the plurality of retrieval queues. Each is set is associated with a respective DRAM device. A scheduler for each respective DRAM device schedules data transfer between its respective storage queue set and the DRAM device and between its retrieval queue set and the DRAM device independently of the scheduling of the other devices, but based on a shared criteria for queue service.

15 Claims, 7 Drawing Sheets

OTHER PUBLICATIONS

Shreedhar, M., Varghese, G., "Efficient Fair Queuing Using Deficit Round Robin", pp. 231-242, SIGCOMM '95, Cambridge, MA, U.S.A..

D. Shah and P. Gupta, "Fast incremental updates on Ternary-CAMs for routing lookups and packet classification," in Proc. of Hot Interconnects-8, Stanford, CA, USA, Aug. 2000.

* cited by examiner

US 7,296,112 B1

HIGH BANDWIDTH MEMORY MANAGEMENT USING MULTI-BANK DRAM DEVICES

CROSS-REFERENCE TO RELATED APPLICATION

This application claims the benefit of priority under 35 U.S.C. § 119(e) to U.S. provisional patent application No. 60/432,528, filed on Dec. 10, 2002, entitled "System and Method for High Bandwidth Memory Management," which is hereby incorporated by reference.

FIELD OF INVENTION

The present invention relates to managing access to dynamic random access memory (DRAM) devices, particularly in a parallel packet processor in a data network.

BACKGROUND

Dynamic random access memories (DRAMs) provide tremendous benefits in terms of storage density and are capable of transferring large amounts of data very quickly if that data is carefully organized into long bursts of consecutive data transfers to and from adjacent memory locations. Since the data interfaces of these DRAMs are limited in their per-pin bandwidth, high bandwidths are achieved through very wide data interfaces.

Certain applications, such as network communications involve the storage and retrieval of relatively small units of data, for example 64 bytes, at bandwidths which exceed 40 Gigabits per second. Wide data interfaces make it impractical to achieve data bursts long enough to make the gaps between bursts insignificant. DRAM access cycles require that a particular row within the device be selected for access and then "precharged." Within a row, column locations can be accessed for reads or writes in rapid sequence. Hence, short random accesses suffer from the precharge latency overhead on each cycle thereby significantly reducing the available bandwidth.

DRAMs can feature multiple independent banks which allow for the overlapping, or pipelining, of memory accesses. DRAMs which implement multiple banks can precharge each of the banks independently. For a read or write access to a bank, that bank is pre-charged independently of other banks. This allows the system designer to "hide" the precharge behind other precharge or data transfer operations. Hence, the presence of multiple banks can reduce precharge latency and increase the utilization of the DRAM's data bus.

However, if a sequence of DRAM accesses were all addressed to the same bank, the benefits of hiding the access latencies behind multiple, overlapping bank operations is lost. It is desirable that a sequence of random DRAM accesses not be targeted at the same banks in order to reduce the precharge latency.

SUMMARY OF INVENTION

The present invention provides overcomes the limitations discussed above by providing storage and retrieval of data segments of a data word distributed among a plurality of banks in a plurality of DRAM devices. In the embodiments discussed below, a data word can have a maximum size. An example of a data word is a cell of a packet. In one example, the data words can be fixed in size, and in another example, the data words can be variable in size.

In one aspect, the present invention provides an embodiment of a system for accessing in parallel a plurality of banks across a plurality of DRAM devices. This system embodiment can operate within a parallel packet processor. This system embodiment comprises a storage distribution control module for storing in parallel data segments of a data word into memory banks across a plurality of DRAM devices. Striping data, meaning to place a portion of a particular data word into several devices or data paths in parallel, is a version of storing in parallel data segments of a data word into memory banks across a plurality of DRAM devices. The storage distribution control module is communicatively coupled to a memory comprising a plurality of storage request queues. In one example, each storage request queue may be implemented as a first-in-first-out (FIFO) memory buffer. In another embodiment, the plurality of storage request queues can be further subdivided into sets wherein each set is communicatively coupled to a scheduler module for a respective DRAM device and to an interface for the respective DRAM device which is communicatively coupled to the memory banks of the respective DRAM device. In one example, the scheduler schedules data transfer between its respective storage request queues set and its respective DRAM device independently of the scheduling of the other devices.

This system embodiment can further comprise a retrieval control module for retrieving the data segments of a requested data word in parallel from the banks of the DRAM devices. The retrieval control module is communicatively coupled to memory comprising a plurality of retrieval request queues. In one example, each retrieval request queue may be implemented as a FIFO memory buffer. The plurality of retrieval request queues can be further subdivided into sets wherein each set is communicatively coupled to the scheduler module for a respective DRAM device and to an interface for the respective DRAM device. In one example, the scheduler schedules data transfer between the banks of its DRAM device and a reassembly buffer to which the device is communicatively coupled. In this embodiment, the scheduler schedules the data transfer independently of the scheduling performed by the other devices.

The retrieval control module further comprises a reassembly control module and is communicatively coupled to the reassembly buffer for storing the data segments. This embodiment can further comprise a data word sorting module for sorting a plurality of reassembled data words in the order of the sequence that their associated retrieval requests were received.

In one aspect, the present invention provides an embodiment of a method for accessing in parallel a plurality of memory banks, each bank being associated with a respective dynamic random access memory (DRAM) device of a plurality of DRAM devices. This method embodiment can operate within a parallel packet processor. This method embodiment comprises partitioning a data word into data segments and storing in parallel data segments of a data word into memory banks across a plurality of DRAM devices. This method embodiment further comprises retrieving the data segments of a requested data word in parallel from the banks of the DRAM devices, and reassembling the data segments into the data word. The storing or the retrieving of the data words can be performed in accordance with an access scheme. An example of an access scheme is a round robin scheme. In another embodiment, the method further comprises sorting a plurality of reassembled data words in the order in the sequence that their associated retrieval requests were received.

In another embodiment, storing in parallel data segments of a data word into memory banks across a plurality of DRAM devices further comprises determining an in-bank burst length based upon the word size bounded by a maximum word size, the total number of banks in the plurality of DRAM devices and the data width of an individual bank. This embodiment can further comprise selecting a bank in each DRAM device in accordance with an access scheme and storing a data segment of the data word in each selected bank in parallel. This embodiment can further comprise scheduling the storage of the data segments independently on a per storage device basis.

In another embodiment of a method for accessing in parallel a plurality of memory banks, retrieving the data segments of a requested data word in parallel from the banks of the DRAM devices comprises determining the starting bank in each DRAM device and retrieving the data segments of the data word in parallel from banks across the DRAM devices in accordance with an access scheme.

One example of a benefit provided by the various embodiments of the invention is achieving very high data storage and retrieval bandwidths, particularly with very short bursts or no bursts. Storing data segments of a data word in parallel into memory banks across a plurality of DRAM devices maximizes the performance of DRAM operations by minimizing the likelihood that a long sequence of accesses will be directed at a single bank, thereby avoiding the incumbent pre-charge latency associated with such a long sequence of accesses at a single bank.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
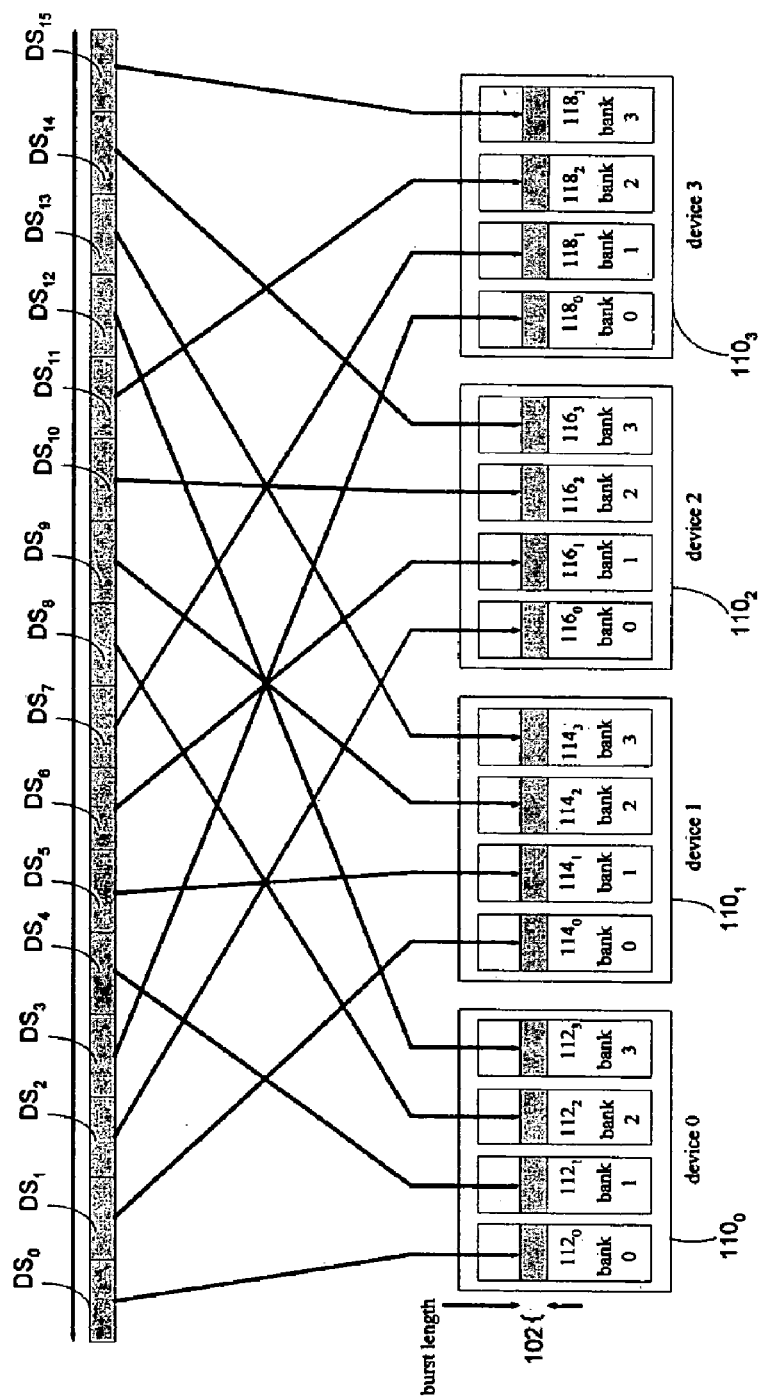
FIG. 1 illustrates an example of a striping data segments of a data word in parallel in banks across a plurality of DRAM devices in accordance with an embodiment of the present invention.

FIG. 1 illustrates an example 100 of a striping data segments of a data word in parallel in banks across a plurality of DRAM devices in accordance with an embodiment of the present invention. In this example, there are four DRAM devices, $110_0$, $110_1$, $110_2$, $110_3$, each with a corresponding set of four banks, $112_0$, $112_1$, $112_2$, $112_3$, $114_0$, $114_1$, $114_2$, $114_3$, $116_0$, $116_1$, $116_2$, $116_3$, and $118_0$, $118_1$, $118_2$, $118_3$. Each bank has the same data width and data storage depth characteristics, and each DRAM device has the same number of banks.

A data word can range in width from a single byte to several hundred bytes or several thousand bytes. In one embodiment in accordance with the present invention as illustrated in FIG. 1, a maximum word width is chosen so as to bound system behavior. In this example, the data word is separated into a number of data segments. In this example, the data segments, a representative example of which is DS1, are of an equal, fixed size. An objective of this example in storing and retrieving data is to ensure that the striping does not wrap around and "reuse" a bank. In other words, each bank is accessed once in one burst for each word's storage or retrieval operation.

For this illustrative example, the maximum word width size is a 512-byte word. A buffer manager (e.g., buffer manager 204, 206) determines the length of the "in-bank" burst 102 for each bank which is used to store and retrieve this 512-byte word. The burst length within a single bank is calculated to be $L=W/(nB)$ where L is the burst length, W is the word size bounded by a maximum word width or size, n is the total number of banks (16 in this example) and B is the width of an individual bank. For this example, B is 4 bytes as each bank for this example has a 4-byte bank width. If necessary, L is rounded up to the next higher convenient integer, such as a power of 2. L=512 bytes/(16 banks)(4 bytes/bank); therefore, L=8 meaning 8 rows of each bank are pre-charged and written to simultaneously in this burst for this 512 byte word.

This example further illustrates storage of data segments according to a round robin scheme beginning with a starting bank in a starting device. For the 512 byte word, there are 64 data segments. A first subset of 16 data segments is illustrated in FIG. 1. In this example, the starting device and starting bank for the storing of the segments is device 0 ($110_0$) bank 0 ($112_0$). In this example, DS1 is allocated to row N of bank 0 of device 0; DS2 is allocated to row N of bank 0 of device 1; DS3 is allocated to row N of bank 0 of device 2; and DS4 is allocated to row N of bank 0 of device 3. Note in FIG. 1 how the first word segment is mapped to bank 0 of device 0 and that the second segment is mapped to bank 0 of device 1. Since these two segments are mapped to fully independent devices, their transfers to and from the devices may indeed be carried out in parallel: DS5 which is separated from DS1 by the number of banks per device is allocated to row N of bank 1 of device 0. DS6 follows the pattern and is allocated to row N of bank 0 of device 1. Data segment, DS17 (not shown), which is separated from DS1 by the total number of banks, 16 in this case, is allocated to row N+1 of bank 0 of device 0. DS18 (not shown) is allocated to row N+1 of bank 0 of device 1 during the burst.

Figure 2:
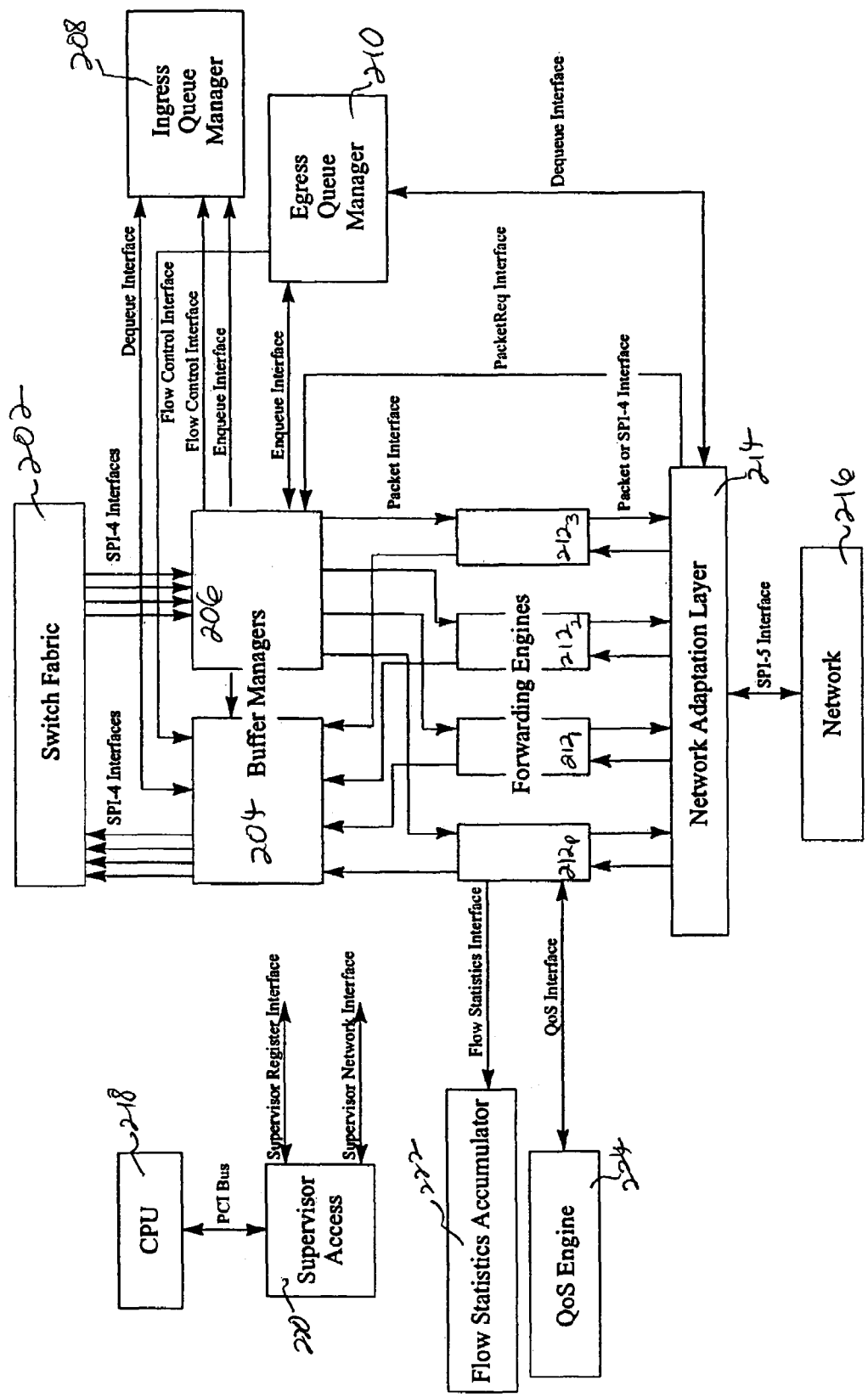
FIG. 2 illustrates an example of a parallel packet processing system in which a system for accessing in parallel a plurality of memory banks in a plurality of DRAM devices can operate in accordance with an embodiment of the present invention.

FIG. 2 illustrates an example of a parallel packet processing system 200 in which a system for accessing in parallel a plurality of memory banks in a plurality of DRAM devices can operate in accordance with an embodiment of the present invention. The processor 200 is a multi-slice network processor that interfaces with a network 216 and a switch fabric 202. The processor 200 also supports multi-channel packet processing. Each of the modules comprises logic which may be stored in one or more computer usable mediums and executed in a variety of device types, including combinations thereof, some examples of which are an integrated circuit, a programmable logic device (PLD) or a central processing unit (CPU).

The system 200 comprises a number of modules including a network adaptation layer 214, forwarding engines $212_1$, $212_2$, $212_3$ $212_N$, an ingress buffer manager 204, an egress buffer manager 206, an ingress queue manger 208, an egress queue manager 210, a supervisor module 218, a supervisor access interface 220, a flow statistics accumulator 222, and a quality of service engine 224. The modules communicate through various communication interfaces. An example of a communication interface is a port connection. Another example of communication interface is a System Packet Interface (SPI). Another example of a communication interface is a connection between a processor executing one or more of the modules and a memory controller responsible for memory reads/writes. Another example is one module reading a parameter (e.g. a header field) stored in a memory location by another module. Another example of a communication interface is a message. Of course, other communication interfaces known to those of ordinary skill in the art may also be used.

The network adaptation module 214 receives and sends packets from and to the network 216 through a System Packet Interface Level 5 (SPI-5) interface. For packets received from the network 216, the network adaptation layer module 114 sends cells of packet data to the forwarding engines $212_1$ to $212_N$. In this example, a cell is has a fixed length cutting down on decision operations caused by size variability. The forwarding engines $212_1$ to $212_N$ perform lookup functions with respect to the packet slice of one or more cells received. As part of its lookup process, a forwarding engine $212_N$ may send information such as a communications flow identifier for a packet, its sequence number, and its length to a Flow Statistics Accumulator (FSA) module 222 through the flow statistics communication interface. This FSA module 222 may be either integrated with the Forwarding Engine or implemented separately. The FSA 222 gathers these statistics on a per-connection basis and enables traffic analysis and detailed billing capabilities. Similarly, each forwarding engine $212_N$ communicates information such as byte count length to the Quality of Service (QoS) engine 224 over communication QoS interface as input for QoS algorithms.

One or more cells of a packet are forwarded to the ingress buffer manager 204 for storage. As there may be a target size for a cell, there may also be a target size for a buffer such as a certain number of cells or bytes so that the throughput from each of the slices is approximately the same. As the one or more packet cells are stored in buffers, the ingress buffer manager 204 maintains a buffer correlation data structure linking the buffers of a slice of data associated with the same packet. In this example, each packet slice is stored independently by the ingress buffer manager 204. Upon completion of the storage of a packet slice, the ingress buffer manager 204 sends an enqueue message to the ingress queue manager 208 for each slice of a common packet via the enqueue communication interface. One of the enqueue messages includes the packet reference.

The ingress buffer manager 204 further comprises a dequeue interface with the ingress queue manager 208 and a flow control interface 223 with the egress queue manager 210. When a packet reference is popped from the head of a queue for ingress retrieval, the ingress queue manager 208 sends a message on the communication dequeue interface to the ingress buffer manager 204 in order to initiate the retrieval and delivery of the desired packet. In one example, one such dequeue message is sent for each slice of the packet stored by the buffer manager.

The egress buffer manager 206 has is communicatively coupled via SPI-4 interfaces with the switch fabric 202 through which it receives each of the egress slices of packet data from the switch fabric 202. As the slices are transferred across the switch fabric, the cell headers are maintained. From the packet identifier and a slice position indicator in the cell header, the buffer manager 206 identifies the slices of the packet. The manager 206 stores each of the egress slices and sends enqueue messages to the egress queue manager 210 via an enqueue communication interface.

When the queue entry for this packet is selected for service, egress queue manager 210 sends a dequeue message via a dequeue communication interface for the packet to the network adaptation layer module 214. The network adaptation layer 214 formulates a packet request message based on the information in the dequeue message which it sends over the packet request communication interface. The packet request message initiates the retrieval of the packet from the egress buffer manager 206. The packet request message "opens" a packet and delivers its first cell. All subsequent cells are delivered in response to cell request messages from the network adaptation layer 214. In an example in which the cell request message does not specify a buffer number, it is implied that the cell request is for the next cell of the current packet within the same channel. In this example, no buffer numbers or other explicit pointers to packet data are included in the cell request message. The buffer correlation data structure maintained by the egress buffer manager 206 is used to locate the packet's cells within a slice. The egress buffer manager 206 has a packet communication interface with each of the forwarding engines $212_N$ through which it forwards the cells of the packet. Each of the forwarding engines $212_1$ to $212_N$ may add or delete a number of bytes from the packet and then forward the cells of the slice it processed via packet interfaces to the network adaptation layer 214.

In this embodiment, each buffer manager 104, 106 has a communication interface for each forwarding engine $212_N$ whose memory it manages with a port of the multi-port switch fabric 202 that transfers the slice in a channel through the switch fabric 202 to an egress port from which a destination forwarding engine $212_N'$ receives the data on the other side of the switch fabric 202. Because an ingress buffer manager 204 is used to handle all of the ingress switch fabric bandwidth and an egress buffer manager 206 is used to handle all of the egress switch fabric bandwidth, load balancing between the buffer managers 204, 206 and the switch fabric 202 is not necessary. Increased transmission speed results from not having another adaptation layer with the switch fabric 202.

Each of the queue managers 204, 206 receives enqueuing related messages and generates dequeuing related messages as discussed above. In between these two activities, a queue manager 108, 110 performs a variety of processes. Some examples of these processes include maintaining a large number of queues, managing resources, managing flow control, and managing load balancing.

The supervisor module 218 performs one or more supervisory functions for the other modules in the system examples of which include initializing, monitoring or updating the various modules in the system. In the illustrated embodiment, each of the modules communicates with the supervisor module 218 through the supervisor access interface 220. The supervisor access interface 220 provides the supervisor module 218 with access to configuration and status registers as well as various internal and external memories for each module in the system for configuration and testing purposes. The supervisor network interface in this embodiment provides access for the supervisor module to the attached networks.

Figure 3:
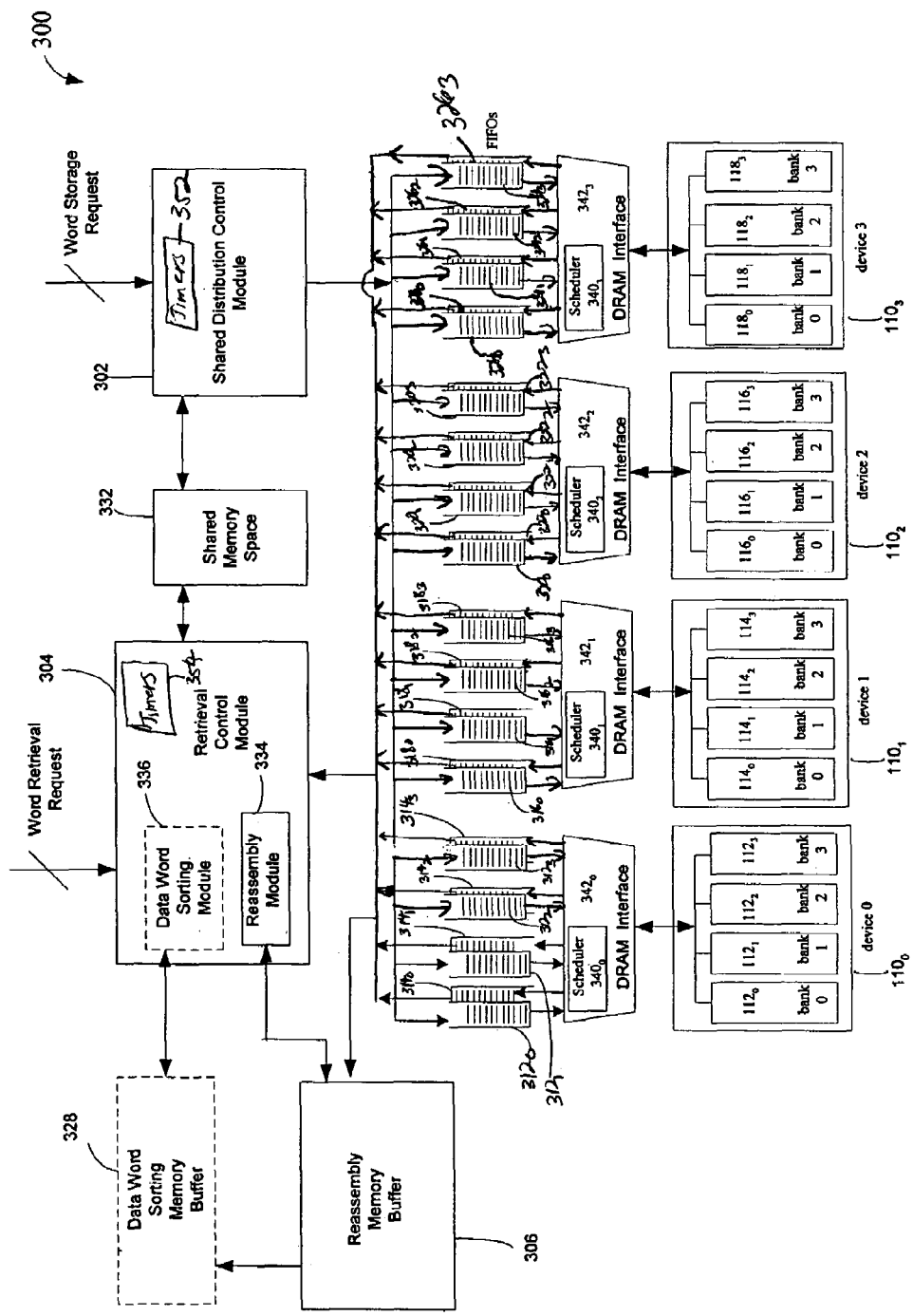
FIG. 3 illustrates a system for accessing in parallel a plurality of banks across a plurality of DRAM devices in accordance with an embodiment of the present invention.

FIG. 3 illustrates a system 300 for accessing in parallel a plurality of banks across a plurality of DRAM devices in accordance with an embodiment of the present invention. This system embodiment can operate within a parallel packet processor, for example within the buffer managers 204, 206 illustrated in FIG. 2. The system 300 comprises a storage distribution control module 302 including timers 352, a retrieval control module 304 including timers 354, a reassembly control module 334, an optional data word sorting module 336, a memory space 332 shared between the control modules 302, 304, a reassembly memory buffer 306, an optional data word sorting buffer 328, a plurality of storage request queues $312_0$, $312_1$, $312_2$, $312_3$, $316_0$, $316_1$, $316_2$, $316_3$, $320_0$, $320_1$, $320_2$, $320_3$, and $324_0$, $324_1$, $324_2$, $324_3$, a plurality of retrieval request queues $314_0$, $314_1$, $314_2$, $314_3$, $318_0$, $318_1$, $318_2$, $318_3$, $322_0$, $322_1$, $322_2$, $322_3$, and $326_0$, $326_1$, $326_2$, $326_3$, a scheduler $340_0$, $340_1$, $340_2$, $340_3$ and DRAM interface $342_0$, $342_1$, $342_2$, $342_3$ for each DRAM device $110_0$, $110_1$, $110_2$, $110_3$. Each DRAM device $110_0$, $110_1$, $110_2$, $110_3$ having a corresponding set of banks, bank 0 to bank 3, $112_0$, to $112_3$, $114_0$, to $114_3$, $116_0$, to $116_3$, $118_0$, to $118_3$. The number of banks and devices and queues are examples for illustrative purposes only and can be scaled in view of this disclosure.

Each of the modules comprises logic which may be stored in one or more computer usable mediums and executed in a variety of device types, including combinations thereof, some examples of which are an integrated circuit, a programmable logic device (PLD) or a central processing unit (CPU). One or more of the elements shown in FIG. 3 can be implemented in software, hardware, firmware, or any combination thereof and may be stored in, for example, a computer usable medium such as a memory or in an integrated circuit. Those skilled in the art will appreciate that although the elements are depicted as individual units for illustrative purposes, the elements may also be implemented in combination.

The storage distribution control module 302 is communicatively coupled to an entity, for example, forwarding engines $212_1$ to $212_N$ or a switch fabric 202, for receiving a storage request for a data word. In a parallel packet processor, the data word can be a packet, a plurality of packets, a portion of packet data or a combination of any of these examples. In one instance, a portion of a packet can be a cell of a packet having a fixed size. The storage distribution control module 302 comprises logic for partitioning a data word into data segments and allocating the data segments in memory banks across the plurality of DRAM devices $110_0$, $110_1$, $110_2$, $110_3$. Examples of logic include instructions embodied in software, hardware, firmware or a combination of any of these. The storage distribution control module 302 creates a storage request for each data segment including a storage address in one of the banks and the data segment to be stored at that storage address. The storage distribution control module 302 is communicatively coupled to a memory space 332 for storing storage information for each data word stored. Examples of storage information include a data word identifier, for example a packet identifier or a cell identifier, the starting address location in which the first data segment of the word is stored, the starting bank, the starting device and the size of the data word in a data size interval such as bytes, or data segments or cells. Alternatively, the address location of each data segment can also be stored as well. The storage distribution control module 302 is communicatively coupled to storage request queues $312_0$, to $312_3$, $316_0$, to $316_3$, $320_0$, to $320_3$, $324_0$, to $324_3$. In the illustrated example, each storage request queue is implemented as a FIFO memory buffer. In the illustrated example, there is a storage request queue for each bank in the DRAM devices. The output of the storage request queues is communicatively coupled to a scheduler $340_0$, $340_1$, $340_2$, $340_3$ and to a DRAM interface module $342_0$, $342_1$, $342_2$, $342_3$ which is communicatively coupled to a set of memory banks (e.g., $112_0$, to $112_3$) of its respective DRAM device (e.g., $110_0$).

The scheduler (e.g. $340_3$) determines the bank to store the data segment for each request based on the storage address of the request, and schedules the data to be transferred to that determined bank by the DRAM interface, preferably in a burst. In this embodiment, each scheduler $340_0$, $340_1$, $340_2$, $340_3$ schedules data transfer between its respective storage request queues set and its respective DRAM device independently of the scheduling of the schedulers of the other devices.

The retrieval control module 304 comprises logic for retrieving the data segments of a requested data word in parallel from the banks of the DRAM devices. The retrieval control module 304 is communicatively coupled to an entity, for example a queue manager 208, 210, to receive retrieval requests for a data word. In this embodiment, the retrieval control module 304 creates retrieval requests for each data segment including the storage address of each data segment. The retrieval control module 304 is communicatively coupled to a plurality of retrieval request queues $314_0$, $314_1$, $314_2$, $314_3$, $318_0$, $318_1$, $318_2$, $318_3$, $322_0$, $322_1$, $322_2$, $322_3$, and $326_0$, $326_1$, $326_2$, $326_3$ which are further subdivided into sets (e.g., $314_0$, to $314_3$) wherein each set is communicatively coupled to the scheduler module $340_0$, $340_1$, $340_2$, $340_3$, for a respective DRAM device $110_0$, $110_1$, $110_2$, $110_3$ and to an interface $342_0$, $342_1$, $342_2$, $342_3$, for the respective DRAM device. In one example, each retrieval request queue is implemented as a FIFO memory buffer. In the illustrated example, there is a retrieval request queue for each bank in the DRAM devices. The outputs of the retrieval request queues are communicatively coupled to the scheduler $340_0$ to $340_3$ and the DRAM interface module $342_0$, $342_1$, $342_2$, $342_3$ for its respective set. Each DRAM interface $342_0$, $342_1$, $342_2$, $342_3$ is communicatively coupled to the reassembly buffer 306. In one example, the size of the reassembly memory buffer 306 (i.e., the number of reassembly locations or contexts) is proportional to the capacity of the retrieval request queues implemented as FIFOs. Each data segment retrieval request created by the retrieval control module 304 includes a pointer to a data word reassembly location within the reassembly buffer. Each of the schedulers $340_0$, $340_1$, $340_2$, $340_3$ schedules data transfer between the banks of its DRAM device and the reassembly buffer 306 to which the device is communicatively coupled. When the burst for retrieving the data segments of the requested word is completed, each retrieved data segment is deposited into a corresponding column of the reassembly memory buffer at the address pointed to by the pointer included in the retrieval request. In this embodiment, the scheduler (e.g., $340_0$) schedules the data transfer independently of the scheduling performed by the other devices.

Although each of the per-device schedulers $340_0$, $340_1$, $340_2$, $340_3$, each selects the order in which the various request queues (FIFOs) are serviced based on the same criteria. In one example, using the current depth of the multiple storage request queue FIFOs, a per-device scheduler module (e.g. $340_1$) determines a starting point for the interleaved distribution of data word segments. This starting point indicates the starting device and starting bank. The request queues provide a smoothing function which tends to improve the efficiency of the overall memory system by giving the scheduler (e.g., $340_1$) more activities to choose from so that it might optimize the order of operations. The per-device scheduler module (e.g., $340_1$) examines the state of each of its associated retrieval request FIFOs. For those FIFOs which are non-empty and emphasizing the most full of the FIFOs, DRAM read cycles are scheduled and executed in a manner which is within the capabilities and limitations of the DRAM devices employed and which maximizes the utilization of the DRAM interface.

The reassembly module 334 comprises logic for reassembling data segments into their respective data word. If data sorting is implemented, the reassembly module 336 transfers reassembled words to the data word sorting memory buffer 328. The optional data sorting module 336 comprises logic for retrieving a plurality of reassembled data words in the order of the sequence that their associated retrieval requests were received from a queue manager. The reassembly module 334 and the data sorting module 336 also have access to the storage information of memory space 332.

In a number of applications, but notably in network communications, the preservation of the order of sequential data is important. The extent of the scrambling accesses over a relatively short temporal distance is proportional to the maximum depth of the request queues (e.g., FIFOs) and is bounded by the load balancing and scheduling techniques employed. In this embodiment of the present invention, to correct this scrambling of the order of data retrieval, the data sorting module 336 allows randomly addressed writes and strictly ordered reads to the data sorting buffer 328. The data sorting buffer 328 can be split up into multiple contexts to allow for multi-channel operations where each sequence of retrievals for a channel is independent from that of another channel.

Another goal of the scheduler is to minimize the frequency with which the DRAM interface must transition from performing storage operations to performing retrieval operations. Such transitions involve the insertion of dead cycles to allow bidirectional interfaces time to "turn around. Furthermore, since the posting of storage and retrieval requests to their FIFOs and the scheduling of DRAM read and write operations are largely decoupled in this embodiment, there is not a fixed relationship between the time an request is posted and the time it is executed. It is often very important to ensure that a write has actually been carried out at the DRAM prior to notifying a user of the data that it is available for retrieval. Failing to ensure this may lead to a read accidentally preceding a write and the read returning invalid data.

In this embodiment, the control modules 302, 304 use a combination of timers 352, 354 and markers to address this problem.

Timers are used to estimate the time required to complete a requested action. In one embodiment, when a request is posted to a queue, a timer 352, 354 is started to track that entry. The timer is set to an initial value which is proportional to the deepest (i.e., most full) of the FIFOs for the associated data word. This timer is set to a value for which the countdown time period is approximately the same time for the requested operation to complete. This timer counts down to its terminal count value of zero at the same time the requested operation is complete. At the expiration of the timer 352, 354 the control module 302, 304 that sent the request confirms that the operation has indeed been carried out by accessing the FIFOs and examining markers placed in the requests in the queue FIFOs. If service of the request has not been completed, the monitoring control module 302, 304 monitors the status of that request continuously and prevents the posting of any further operations of the same type until the service of the request is completed or a system error timeout is reached. Stalling the posting of operations in this way has the effect of synchronizing the posting of requests and their execution as well as minimizing the skew between request queue FIFOs.

For illustrative purposes, the method embodiments illustrated in FIGS. 4 through 8 are discussed in the context of the system embodiment 300 of FIG. 3.

Figure 4:
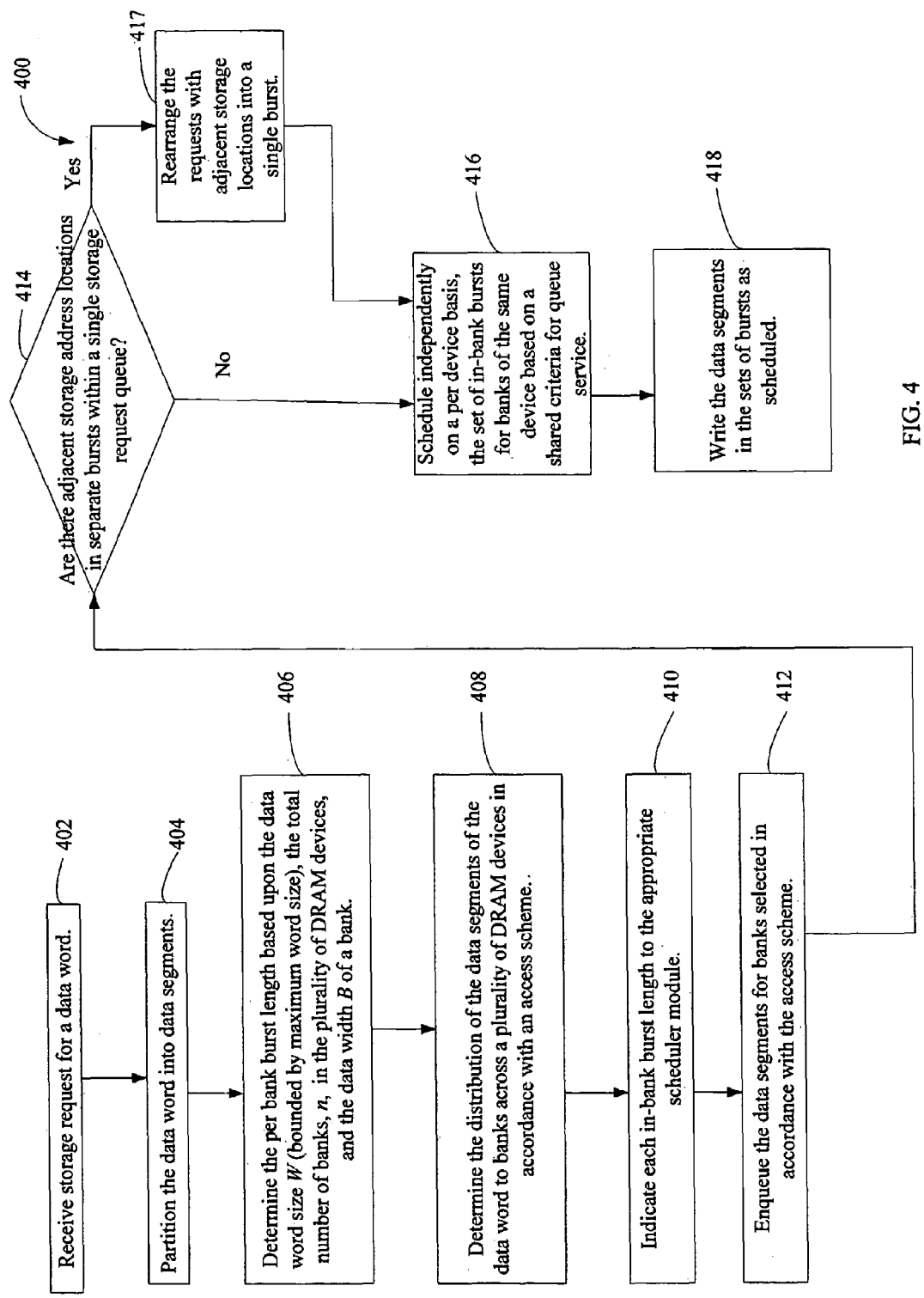
FIG. 4 illustrates a method for accessing in parallel a plurality of memory banks in a plurality of DRAM devices for storing a data word in accordance with an embodiment of the present invention.

FIG. 4 illustrates a method 400 for accessing in parallel a plurality of memory banks in a plurality of DRAM devices for storing a data word in accordance with an embodiment of the present invention. The storage distribution control module 302 receives 402 a storage request including a data word (e.g., a packet, group of packets, or a cell of a packet) from a queue manager, for example ingress queue manager 208, and partitions 404 the data word into data segments. The storage distribution control module 302 determines 406 the per bank burst length based upon the data word size bounded by the maximum word size, a total number of banks in the plurality of DRAM devices and the data width of an individual bank. As data words can vary in size in one example, a subset of the banks can store the data word or a plurality of rows in all of the banks can be pre-charged in a long burst for a large data word. The storage control module 302 determines 408 the distribution of the data segments of the data word to memory banks across a plurality of DRAM devices in accordance with an access scheme. An example of an access scheme is the round robin scheme illustrated in FIG. 1. The storage control module 302 indicates 410 each in-bank burst length of the word to the appropriate scheduler $340_0$, $340_1$, $340_2$, $340_3$. For example, the control module 302 can send a message to the appropriate scheduler $340_0$, $340_1$, $340_2$, $340_3$ or a field may be set in the first data segment storage request of the data word for a particular bank. The storage control module 302 enqueues 412 the data segments for the banks selected in accordance with the access scheme. As part of this enqueuing in one example, the control module 302 creates a storage request including the data segment and its address in a bank and enqueues each storage request in the storage request queue of the allocated bank.

A respective scheduler (e.g., 3400) can optionally determine 414 whether there are adjacent storage address locations in separate bursts within a single storage request queue (e.g., $312_0$) for a bank (e.g., bank0 of device0 $312_0$). Responsive 414 to the existence of the adjacent storage address locations, the respective scheduler rearranges 417 the storage request entries in the queue (e.g., $312_0$) having the adjacent address locations into a single burst for the associated bank. Each scheduler $340_0$, $340_1$, $340_2$, and $340_3$ having banks in which data segments are to be stored schedules 416 independently on a per-device basis, the set of in-bank bursts for banks of the same device, but based on the shared criteria for request queue service used by all the schedulers $340_0$, $340_1$, $340_2$, and $340_3$. The DRAM interfaces $342_0$, $342_1$, $342_2$, and $342_3$ write 418 the data segments in the sets of bursts as scheduled.

Figure 5:
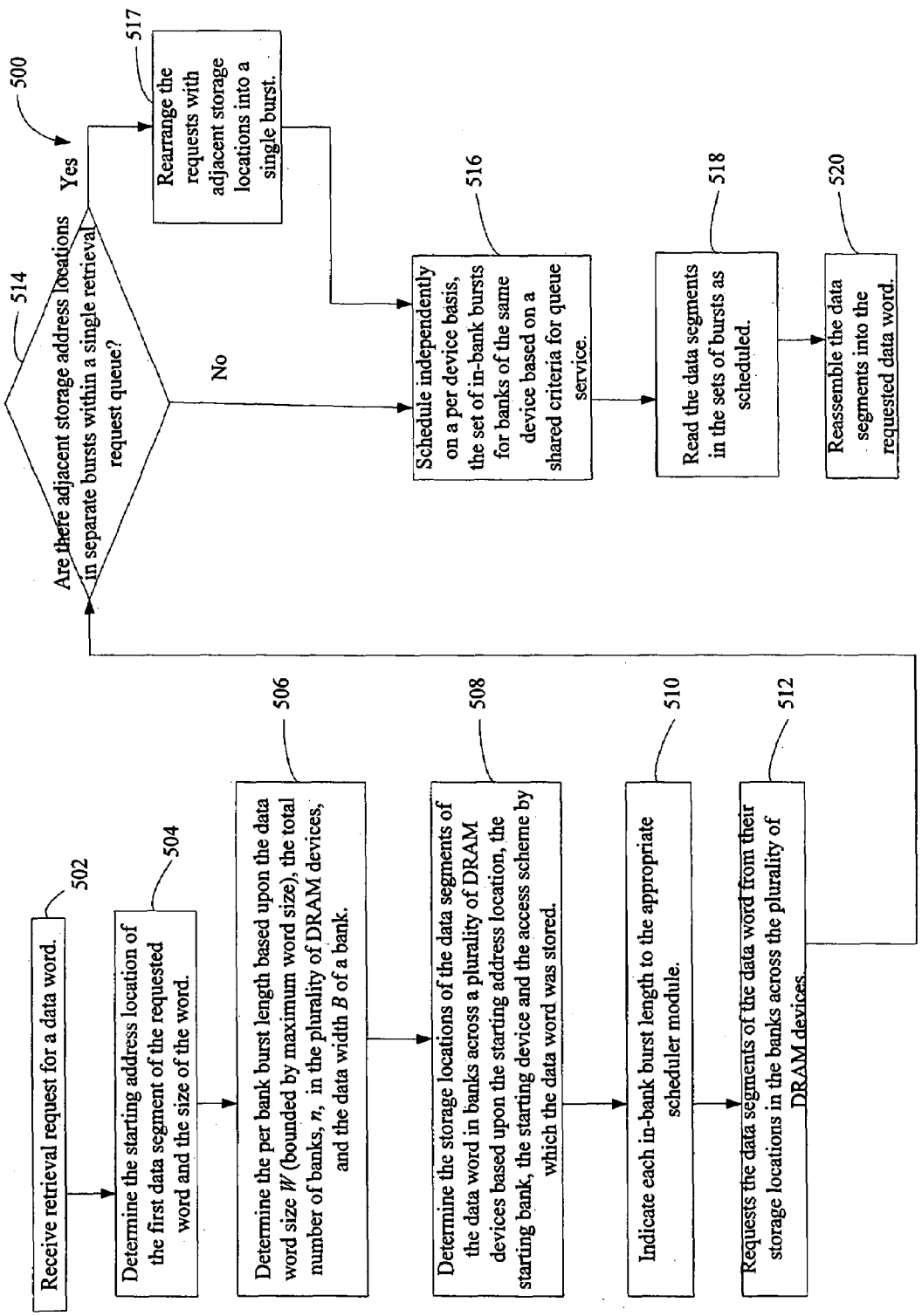
FIG. 5 illustrates a method for accessing in parallel a plurality of memory banks in a plurality of DRAM devices for retrieving a data word in accordance with an embodiment of the present invention.

FIG. 5 illustrates a method 500 for accessing in parallel a plurality of memory banks in a plurality of DRAM devices for retrieving a data word in accordance with an embodiment of the present invention. The retrieval control module 304 receives 502 a retrieval request for a data word from a queue manager, e.g., egress queue manager 310. The retrieval control module 304 determines 504 the starting address location of the first data segment of the requested word and the size of the word. The retrieval control module 304 determines 506 the per bank burst length based upon the word size W bounded by the maximum word size, a total number, n, of banks in the plurality of DRAM devices and the data width, B, of an individual bank. The retrieval control module 304 determines 508 the distribution of the storage locations of the data segments of the data word stored in banks (e.g., $112_0$, $112_1$, $114_0$, $114_1$, $116_0$, $118_0$) across the plurality of DRAM devices $110_0$, $110_1$, $110_2$, $110_3$ based upon the starting address location, the starting bank, the starting device and the access scheme by which the data word was stored. The retrieval control module 304 indicates 510 each in-bank burst length to the appropriate scheduler $340_0$, $340_1$, $340_2$, $340_3$. For example, the retrieval control module 304 can send a message to the appropriate scheduler $340_0$, $340_1$, $340_2$, $340_3$ or a field may be set in the first data segment retrieval request of the data word for a particular bank. The retrieval control module 304 requests 512 the data segments of the data word from their storage locations in the banks across the plurality of DRAM devices $110_0$, $110_1$, $110_2$, $110_3$. For example, retrieval control module 304 creates a retrieval request for each data segment including the storage address location for the data segment and a pointer to a reassembly location in the reassembly buffer 306, and enqueues each retrieval request in the retrieval request queue for the bank having the storage location.

A respective scheduler (e.g., $340_0$) can optionally determine 514 whether there are adjacent storage address locations within a single retrieval request queue (e.g., $312_0$) for a bank (e.g., bank0 of device0). Responsive 514 to the existence of adjacent storage address locations, the respective scheduler rearranges 517 the retrieval request entries in the queue (e.g., $312_0$) having the adjacent address locations into a single burst for the associated bank. Each scheduler $340_0$, $340_1$, $340_2$, $340_3$ having banks from which data segments are to be retrieved schedules 516 independently on a per-device basis, the set of in-bank bursts for banks of the same device, but based on the shared criteria for request queue service used by all the schedulers 3400, 3401, 3402, and 3403. The DRAM interfaces $342_0$, $342_1$, $342_2$, and $342_3$ read 518 the data segments in the sets of bursts as scheduled.

The reassembly module 334 reassembles 520 the data segments into the data word. In this method embodiment, an optional data sorting of retrieved words can be performed. As soon as all of the pending data word segment retrievals have been performed, the completed data word is delivered to the requesting entity or is sorted into the sequence of receipt of its word retrieval request. For the system embodiment of FIG. 3, the delivery of the reassembled data word also results in the deallocation of the reassembly location utilized so that it may be reallocated to a future retrieval operation. If data sorting is not performed, the reassembly module 334 notifies the retrieval control module 304 that the data word is ready for retrieval, and the retrieval control module 304 delivers the data word to the requesting entity. If data sorting is performed, the data sorting module 336 sorts a plurality of reassembled data words in the order of the sequence that their associated retrieval requests were received, and notifies the retrieval control module 304 responsive to the data word being ready for retrieval in the sequence of its retrieval request. The retrieval control module 304 delivers the data word to the requesting entity.

Figure 6:
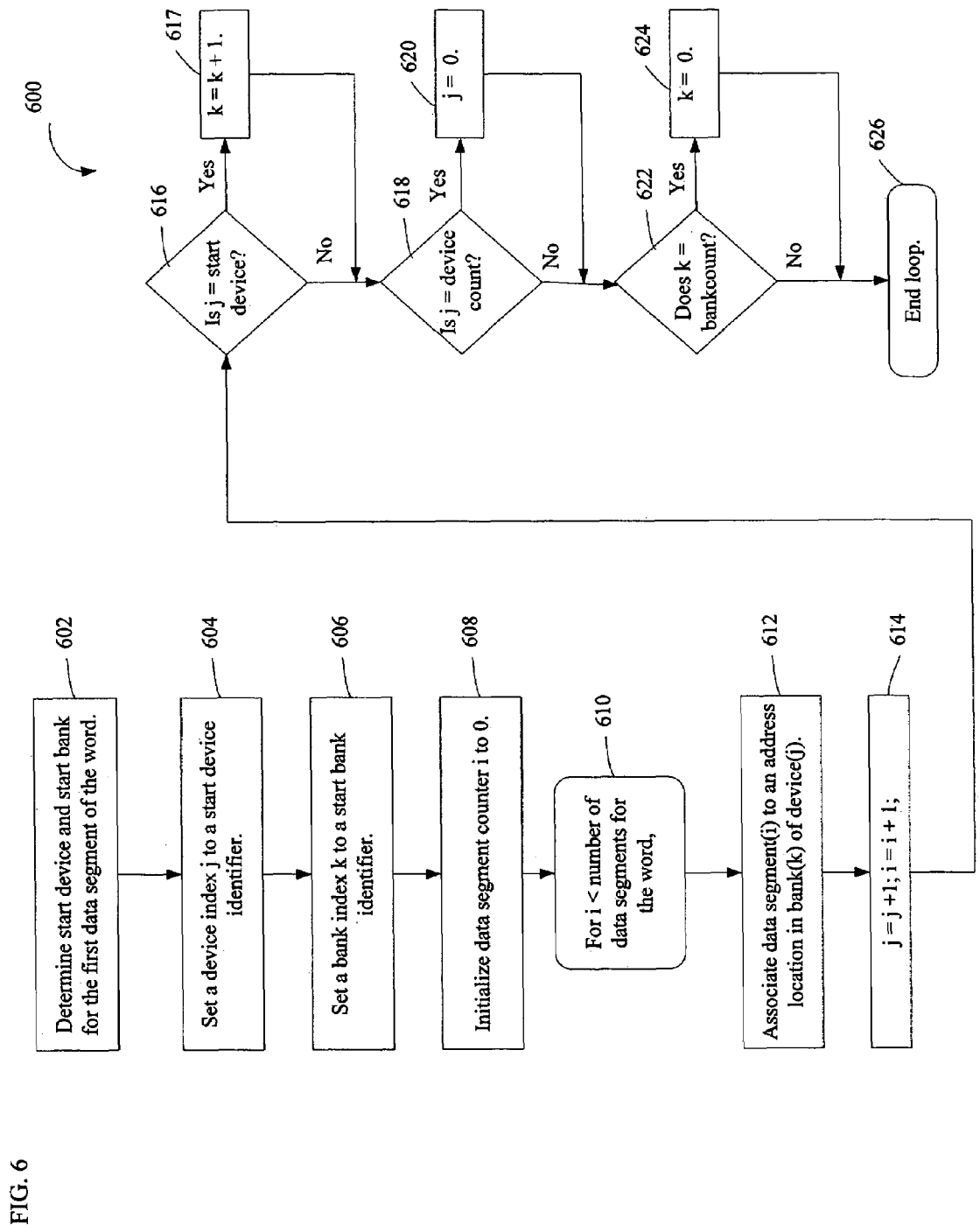
FIG. 6 illustrates a method for determining the distribution of the data segments of a data word to memory banks across a plurality of DRAM devices based upon a round robin access scheme in accordance with an embodiment of the present invention.

FIG. 6 illustrates a method 600 for determining the distribution of the data segments of a data word to memory banks across a plurality of DRAM devices based upon a round robin access scheme in accordance with an embodiment of the present invention. In one embodiment, the storage distribution control module 302 determines 602 the start device and the start bank for the first data segment of the word as part of its distribution determination. The retrieval control module 304 retrieves the start device and start bank for the data word from shared memory space 332. In a system where the word width is fixed, an interleaved striping pattern is not necessary; segments of the word can simply be mapped directly across to banks within DRAM devices. However, when the word width is allowed to vary, then an interleaving process makes it less likely that narrow words will tend to concentrate accesses at a small number of devices. There are a number of methods possible for choosing the starting device and bank. One drawback of choosing bank 0 of device 0 as the starting bank for storing all words is this choice overly burdens this bank and severely penalizes the performance of the system when predominantly narrow data words are being stored and retrieved. By choosing a starting point in the interleaving process which tends to more evenly distributes the load among the banks, performance is increased for narrow data words. Typically, the least recently used banks or the banks with the fewest pending operations are the first choice for starting banks.

Either the storage distribution module 302 or the retrieval control module 304 sets 604 device index j=to a start device identifier, start device, which also can be an index of a device, sets 606 a bank index k=to a start bank identifier, start bank, which can also be an index of a bank within a device, and initializes 608 a data segment counter, i, to zero. In the illustrative example of FIG. 6, a loop assigns data segments to banks; however, other logical constructs can be used as well. For example, decisions based on if-then statements can be implemented to assign the data segments to banks as well. For the data segment index, i, being 610 less than the number of data segments for the data word, either of the control modules 302, 304 associates 612 data segment (i) to an address location in memory bank (k) of devices) and increments 614 the device index j and the data segment index i. In this example, the increment is 1; however, other incremental values can be used as well. Responsive 616 to the device index j=the start device indicating a wraparound to the start device, either control module 302, 304 increments 617, by 1, in this example the bank index k so that the next data segment is written to or retrieved from the next bank in parallel. Responsive 616 to the device index j being not equal to the start device or after incrementing 617 k, either control module 302, 304 determines 618 whether the device index j equals the number of devices, device Count. Responsive 618 to j equaling deviceCount, j is set 620 to 0. Responsive 618 to j not equaling deviceCount or setting j=0, either control module 302, 304 determines 622 whether bank index k equals the number of banks per device, bankCount. Responsive 622 to k equaling bankCount, either control module 302, 304 sets 624 k=0. Responsive 622 to k not equaling bankCount or setting 624 k=0, either control module 302, 304 repeats 626 the loop for the number of data segments for this word.

Figure 7:
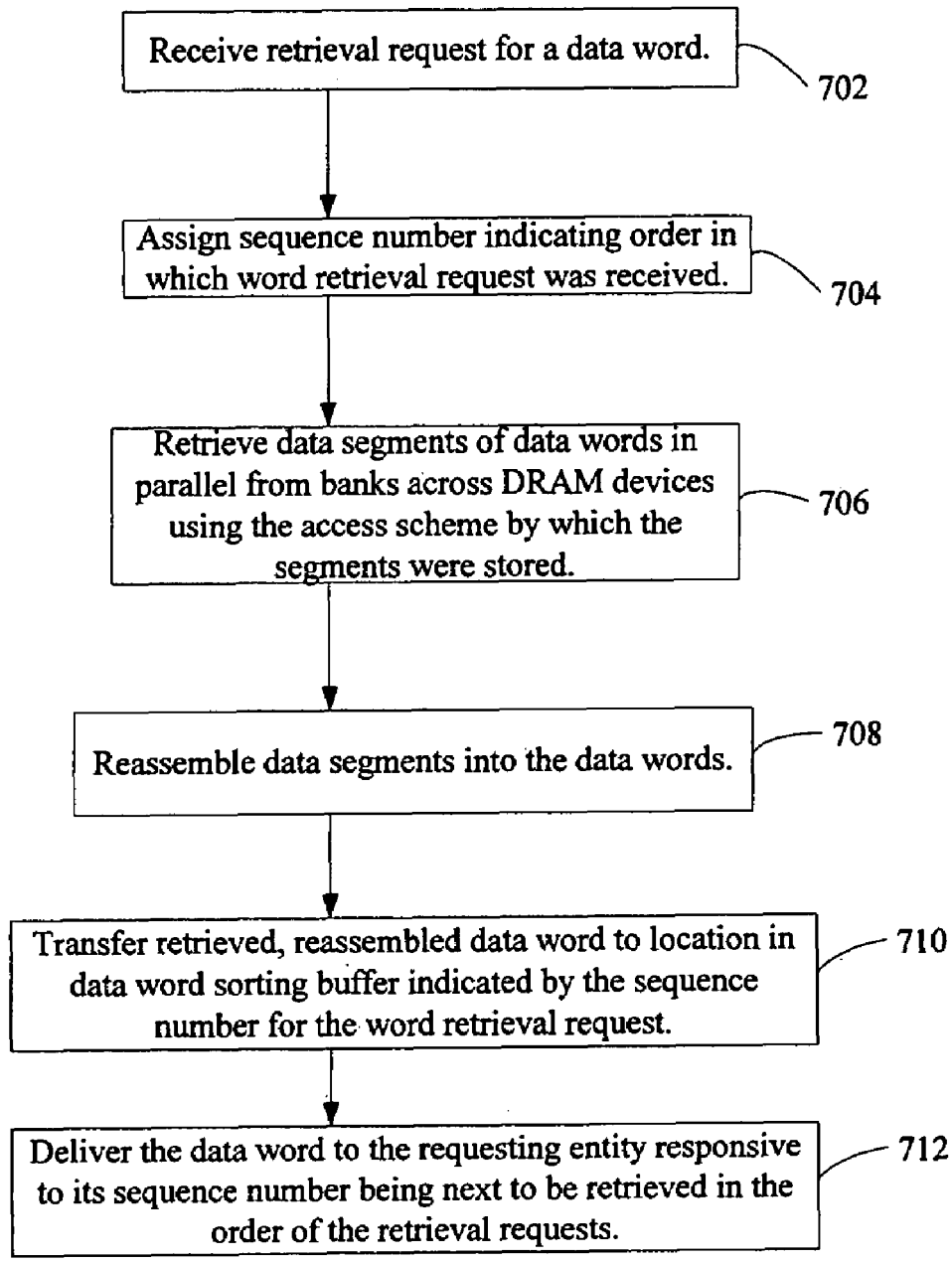
FIG. 7 illustrates a method for reordering a plurality of reassembled data words in the in the sequence that their associated retrieval requests were received in accordance with an embodiment of the present invention.

FIG. 7 illustrates a method 700 for data word sorting a plurality of reassembled data words in the in the sequence that their associated retrieval requests were received in accordance with an embodiment of the present invention. The retrieval control module 304 receives 702 a retrieval request for a data word. It assigns 704 a sequence number for the data word indicating the order of receipt of the retrieval request. This sequence number can be stored in one example in memory space 332 which is also accessible to the data sorting module 336. In one example, the sequence number is a number whose modulo corresponds to the depth of the data sorting buffer 328. Under the control of the retrieval control module 304, the data segments of the requested data word are retrieved 706 in parallel using an access scheme from banks across the DRAM devices. The reassembly module 334 reassembles 708 the data segments into the data word. Either the reassembly module 334 or the data sorting module 336 writes 710 the retrieved, reassembled data word to an address location in the data sorting buffer 328 indicated by the sequence number for the data word. The data sorting module 336 delivers 712 the data word in the data sorting buffer 328 to the requesting entity responsive to its sequence number being next to be retrieved in the order of the sequence of retrieval requests. In this way, data words are written out of sequence to the reordering buffer but the data sorting module 336 reads the data words sequentially with respect to the order of the retrieval requests. As contiguous data sorting buffer 328 locations are filled with valid data, they are made available to the requesting entities of the data words. When, during this delivery process, a gap in valid data is encountered, the delivery process is halted until the gap is eventually filled with valid data or an error is indicated.

It should be understood by those of ordinary skill in the art that these examples have been presented by way of example only, and not limitation. Though the examples herein are described in certain specific examples regarding port counts, bandwidths, storage capacities and the like, it will be apparent to those of ordinary skill in the art in light of the teachings herein that each of these parameters may be readily scaled up or down and still remain consistent with the description. It will be understood by those of ordinary skill in the relevant art that various changes in form and the details of the examples described above may be made without departing from the spirit and scope of the present invention.

The invention claimed is:

1. A method for accessing a plurality of dynamic random access: memory (DRAM) devices in parallel, each DRAM device having at least one memory bank, the method comprising:

for each storage request for a data word, determining a distribution of data segments of the data word in a plurality of memory banks based on the usage of the memory banks, the plurality of memory banks being among the memory banks of the plurality of DRAM devices, wherein a first data segment of a first data word and a second data segment of a second data word are distributed to a same memory bank according to a distribution of data segments of the first and second data words;

determining a sequence of retrieving the data segments of the first and second data words, the sequence of retrieving the first data segment and the second data segment determined by retrieval of other data segments from the same memory bank;

retrieving the data segments of the first and second data words in parallel from the plurality of memory banks based on the distribution of the data segments of the first and second data words and the sequence; and reassembling the retrieved data segments into the first and second data words.

2. The method of claim 1 further comprising:
receiving a retrieval request for the first data word and a retrieval request for the second data word, wherein the sequence of retrieving the first data segment and the second data segment can be different from the order of the retrieval requests received.

3. The method of claim 1 wherein at least one of the first and second data words has a maximum word size.

4. The method of claim 1 wherein at least one of the first and second data words includes a cell of a packet.

5. The method of claim 1 wherein at least one of the first and second data words has a fixed word size.

6. The method of claim 1 wherein at least one of the first and second data words has a variable word size.

7. The method of claim 1, further comprising:
partitioning the first and second data words into the data segments; and
storing the data segments in parallel into the plurality of memory banks based on the distribution.

8. The method of claim 7, wherein storing the data segments in parallel into the plurality of memory banks based on the distribution comprises:
determining an in-bank burst length based upon a maximum word size, a total number of the plurality of memory banks, and a data width of an individual memory bank; and
storing the data segments in parallel into the plurality of memory banks based on the distribution in a burst having the in-bank burst length.

9. The method of claim 1 wherein data segments of at least one of the first and second data words are stored in at least one memory bank from each of the plurality of DRAM devices.

10. The method of claim 1, wherein the sequence of retrieving the data segments within a first DRAM device is independent from the sequence of retrieving the data segments within a second DRAM device, the first and second DRAM devices being among the plurality of DRAM devices, the method further comprising:
scheduling the storing of the data segments independently within a DRAM device.

11. The method of claim 1 wherein retrieving the data segments in parallel comprises:
determining a starting memory bank in each of the plurality of DRAM devices storing at least one of the data segments; and
retrieving the data segments in parallel from the starting memory banks.

12. The method of claim 1, wherein the data segments stored in the same memory bank are retrieved in one burst.

13. A system for providing fast access to dynamic random access memory (DRAM) devices, the system comprising:
- a plurality of DRAM devices, each DRAM device having at least one memory bank;
- a processor; and
- a memory unit comprising a computer usable medium that comprises microcode for execution by the processor to cause the processor to perform the operations of:
  - for each storage request for a data word, determining a distribution of data segments of a data word in a plurality of memory banks based on the usage of the memory banks, the plurality of memory banks being among the memory banks of the plurality of DRAM devices, wherein a first data segment of a first data word and a second data segment of a second data word are distributed to a same memory bank according to a distribution of data segments of the first and second data words;
  - determining a sequence of retrieving the data segments of the first and second data words, the sequence of retrieving the first data segment and the second data segment determined by retrieval of other data segments from the same memory bank;
  - retrieving the data segments of the first and second data words in parallel from the plurality of memory banks based on the distribution of the data segments of the first and second data words and the sequence; and
  - reassembling the retrieved data segments into the first and second data words.

14. The system of claim 13, wherein the computer usable medium further comprises microcode for execution by the processor to cause the processor to perform the operation of:
- partitioning the first and second data words into the data segments; and
- storing the data segments in parallel into the plurality of memory banks based on the distribution.

15. A system for providing fast access to dynamic random access memory (DRAM) devices, the system comprising:
- a plurality of DRAM devices, each DRAM device having at least one memory bank;
- a storage distribution control module configured to partition a first data word and a second data word into data segments, to determine a distribution of data segments of a data word in a plurality of memory banks based on the usage of the memory banks responsive to each storage request for the data word, the plurality of memory banks being among the memory banks of the plurality of DRAM devices, wherein a first data segment of the first data word and a second data segment of the second data word are distributed to a same memory bank according to a distribution of data segments of the first and second data words;
- a scheduler associated with each DRAM device, configured to determine a storage schedule to store the data segments of the first and second data words distributed to the associated DRAM device in the plurality of memory banks, and to determine a retrieval schedule to retrieve the data segments of the first and second data words stored in the associated DRAM device from the plurality of memory banks, the retrieval schedule of retrieving the first data segment and the second data segment determined by retrieval of other data segments from the same memory bank, the storage schedule and the retrieval schedule of one DRAM device being independent of the storage schedules and retrieval schedules of other DRAM devices; and
- a retrieval control module configured to retrieve the data segments in parallel from the plurality of memory banks based on the distribution and the retrieval schedule, and to reassemble the retrieved data segments into the first and second data words.

* * * * *